US009196024B2

(12) United States Patent
Weng et al.

(10) Patent No.: US 9,196,024 B2
(45) Date of Patent: Nov. 24, 2015

(54) METHOD AND APPARATUS FOR ENHANCING COLOR

(71) Applicant: Huawei Technologies Co., Ltd., Shenzhen, Guangdong (CN)

(72) Inventors: Diwang Weng, Hangzhou (CN); Jinsheng Xiao, Shenzhen (CN); Benshun Yi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/331,544

(22) Filed: Jul. 15, 2014

(65) Prior Publication Data

US 2014/0328539 A1 Nov. 6, 2014

Related U.S. Application Data

(63) Continuation of application No. PCT/CN2013/084377, filed on Sep. 27, 2013.

(30) Foreign Application Priority Data

Apr. 19, 2013 (CN) .......................... 2013 1 0137163

(51) Int. Cl.
*G06K 9/00* (2006.01)
*G06T 5/00* (2006.01)
*G06T 5/20* (2006.01)

(52) U.S. Cl.
CPC ............... *G06T 5/008* (2013.01); *G06T 5/002* (2013.01); *G06T 5/20* (2013.01); *G06T 2207/10024* (2013.01)

(58) Field of Classification Search
CPC ......... G06T 5/003; G06T 5/008; G06T 5/009; G06T 5/10; G06T 5/20; G06T 5/40; G06T 2207/10024; H04N 1/4072; H04N 1/6086; H04N 5/2351; H04N 5/243; H04N 9/646
See application file for complete search history.

(56) References Cited

U.S. PATENT DOCUMENTS 5,991,456 A * 11/1999 Rahman et al. ............... 382/254
6,834,125 B2 * 12/2004 Woodell et al. ............... 382/274

(Continued)

FOREIGN PATENT DOCUMENTS

CN 101303766 A 11/2008

(Continued)

OTHER PUBLICATIONS

Doo Hyun, et al., "Color Image Enhancement Using Single-Scale Retinex Based on an Improved Image Formation Model", 16th European Signal Processing Conference (EUSIPCO 2008), Aug. 25-29, 2008, 5 pages.

Daniel J. Jobson, et al., "Properties and Performance of a Center/Surround Retinex", IEEE Transactions on Image Processing, vol. 6, No. 3, Mar. 1997, p. 451-462.

*Primary Examiner* — Jose Couso

(57) ABSTRACT

Embodiments of the present invention disclose a method and an apparatus for enhancing color, and relate to the image processing field, so as to solve a case of over enhancement on a region having high luminance in an original image which is caused after enhancement processing is performed. A specific solution is: obtaining a luminance component of a currently processed image; performing Gaussian filtering processing on the luminance component to obtain an illumination component; obtaining a first reflection component of the currently processed image according to the luminance component and the illumination component; performing enhancement adjustment on the first reflection component to obtain a second reflection component; obtaining a luminance gain according to the luminance component and the second reflection component; and performing enhancement processing on the currently processed image, to obtain a first enhanced image. The present invention is applicable to a process of color enhancement.

16 Claims, 4 Drawing Sheets

(56) References Cited

U.S. PATENT DOCUMENTS

| | | | |
|---|---|---|---|
| 6,842,543 B2* | 1/2005 | Woodell et al. | 382/274 |
| 8,111,943 B2* | 2/2012 | Jobson et al. | 382/274 |
| 8,649,629 B2* | 2/2014 | Lim et al. | 382/274 |
| 2008/0107333 A1 | 5/2008 | Mazinani et al. | |
| 2008/0240598 A1 | 10/2008 | Hasegawa | |

FOREIGN PATENT DOCUMENTS

| | | |
|---|---|---|
| CN | 102044070 A | 5/2011 |
| CN | 102129673 A | 7/2011 |
| CN | 102436640 A | 5/2012 |
| CN | 103236040 A | 8/2013 |
| KR | 0771158 B1 | 10/2007 |

* cited by examiner

METHOD AND APPARATUS FOR ENHANCING COLOR

CROSS-REFERENCE TO RELATED APPLICATIONS

This application is a continuation of International Application No. PCT/CN2013/084377, filed on Sep. 27, 2013, which claims priority to Chinese Patent Application No. 201310137163.X, filed on Apr. 19, 2013, both of which are hereby incorporated by reference in their entireties.

TECHNICAL FIELD

The present invention relates to the image processing field, and in particular, to a method and an apparatus for enhancing color.

BACKGROUND

With the continuous development of information technologies, people have higher and higher requirements on image quality. It is commonly known that in a process of obtaining an image, the image may be caused to be not clear under the influence of various factors such as an image-shooting device and illumination. Therefore, in order to ensure that people can view a clear image, enhancement processing needs to be performed on the image. This may improve contrast of the image by effectively compressing a dynamic range of the image, thereby improving image quality.

American physicist Edwin Land proposed the Retinex theory based on color constancy, which holds that color, which is perceived by a human being, of an object is closely related to a reflection property of a surface of the object and is not affected by an uncertain factor such as the intensity of a light source or non-uniform illumination. In the prior art, a multi-scale color enhancement solution based on color constancy is proposed. A fundamental principle of this solution is that: a luminance component is extracted from an original image; multi-scale Gaussian filtering is performed on the luminance component of the original image to obtain an illumination component of the original image, so that a reflection component of the original image is isolated; then, a luminance enhancement ratio is obtained according to the reflection component and the luminance component; and eventually, three color channels of the original image are multiplied respectively by the luminance enhancement ratio to obtain an enhanced image.

In a process of implementing the image enhancement described above, the inventor finds that the prior art has at least the following problem: The enhancement on the image is implemented by multiplying the three color channels of the original image respectively by the luminance enhancement ratio. However, this causes a region having high luminance in the original image to be too bright, and therefore, a condition of over enhancement occurs; moreover, certain detailed information of this part may be lost, and a region having low luminance in the original image may also be caused to have a large amount of noise.

SUMMARY

Embodiments of the present invention provide a method and an apparatus for enhancing color, so as to solve a case of over enhancement on a region having high luminance in an original image which is caused after enhancement processing is performed, and eliminate a large amount of noise that occurs on a region having low luminance in the original image after the enhancement processing is performed.

To achieve the above objective, embodiments of the present invention adopt the following technical solutions:

A first aspect of the present invention provides a method for enhancing color, including:

obtaining a luminance component of a currently processed image;

performing Gaussian filtering processing on the luminance component to obtain an illumination component of the currently processed image;

obtaining a first reflection component of the currently processed image according to the luminance component and the illumination component;

performing enhancement adjustment on the first reflection component to obtain a second reflection component;

obtaining a luminance gain according to the luminance component and the second reflection component; and performing enhancement processing on the currently processed image according to the luminance gain, to obtain a first enhanced image.

With reference to the first aspect, in a possible implementation manner, the performing enhancement adjustment on the first reflection component to obtain a second reflection component includes:

performing linear stretching on the first reflection component; and performing the enhancement adjustment on the first reflection component obtained after the linear stretching to obtain the second reflection component.

With reference to the first aspect and the possible implementation manner described above, in another possible implementation manner, the method further includes:

decomposing the currently processed image according to an RGB space principle, to obtain a color component set, where the color component set includes an R component, a G component, and a B component;

performing wavelet low-pass filtering processing of a same scale respectively on each color component in the color component set, thereby obtaining an illumination component set, where the illumination component set includes an illumination component of an R channel of the currently processed image, an illumination component of a G channel of the currently processed image, and an illumination component of a B channel of the currently processed image;

obtaining a first reflection component set according to the color component set and the illumination component set, where the first reflection component set includes a first reflection component of the R channel of the currently processed image, a first reflection component of the G channel of the currently processed image, and a first reflection component of the B channel of the currently processed image;

performing multicolor restoration processing respectively on the reflection component of each channel in the first reflection component set to obtain a second reflection component set;

performing linear stretching respectively on a reflection component of each channel in the second reflection component set; and obtaining a second enhanced image according to the second reflection component obtained after the linear stretching.

With reference to the first aspect and the possible implementation manners described above, in another possible implementation manner, the obtaining a first reflection component set according to the color component set and the illumination component set includes:

amplifying each color component in the color component set respectively by a same ratio; and obtaining the first reflection component set according to the color component set after the processing and the illumination component set.

With reference to the first aspect and the possible implementation manners described above, in another possible implementation manner, after the performing enhancement processing on the currently processed image according to the luminance gain, to obtain a first enhanced image, and the obtaining a second enhanced image according to the second reflection component obtained after the linear stretching, the method further includes:

obtaining an enhanced image of the currently processed image according to the first enhanced image and the second enhanced image.

A second aspect of the present invention provides an apparatus for enhancing color, including:

a first obtaining unit, configured to obtain a luminance component of a currently processed image;

a first filtering unit, configured to perform Gaussian filtering processing on the luminance component obtained by the first obtaining unit to obtain an illumination component of the currently processed image;

a second obtaining unit, configured to obtain a first reflection component of the currently processed image according to the luminance component obtained by the first obtaining unit and the illumination component obtained by the first filtering unit;

an adjusting unit, configured to perform enhancement adjustment on the first reflection component obtained by the second obtaining unit to obtain a second reflection component;

a third obtaining unit, configured to obtain a luminance gain according to the luminance component obtained by the first obtaining unit and the second reflection component obtained by the adjusting unit; and an enhancement processing unit, configured to perform enhancement processing on the currently processed image according to the luminance gain obtained by the third obtaining unit, to obtain a first enhanced image.

With reference to the second aspect, in a possible implementation manner, the adjusting unit includes:

a stretching module, configured to perform linear stretching on the first reflection component; and an adjusting module, configured to perform the enhancement adjustment on the first reflection component obtained after the linear stretching to obtain the second reflection component.

With reference to the second aspect and the possible implementation manner described above, in another possible implementation manner, the apparatus further includes:

a fourth obtaining unit, configured to decompose the currently processed image according to an RGB space principle, to obtain a color component set, where the color component set includes an R component, a G component, and a B component;

a second filtering unit, configured to perform wavelet low-pass filtering processing of a same scale respectively on each color component in the color component set obtained by the fourth obtaining unit, thereby obtaining an illumination component set, where the illumination component set includes an illumination component of an R channel of the currently processed image, an illumination component of a G channel of the currently processed image, and an illumination component of a B channel of the currently processed image;

a fifth obtaining unit, configured to obtain a first reflection component set according to the color component set obtained by the fourth obtaining unit and the illumination component set obtained by the second filtering unit, where the first reflection component set includes a first reflection component of the R channel of the currently processed image, a first reflection component of the G channel of the currently processed image, and a first reflection component of the B channel of the currently processed image;

a restoration processing unit, configured to perform multi-color restoration processing respectively on the reflection component of each channel in the first reflection component set obtained by the fifth obtaining unit, thereby obtaining a second reflection component set;

a stretching unit, configured to perform linear stretching respectively on a reflection component of each channel in the second reflection component set obtained by the restoration processing unit; and a sixth obtaining unit, configured to obtain a second enhanced image according to the second reflection component obtained after the linear stretching.

With reference to the second aspect and the possible implementation manners described above, in another possible implementation manner, the fifth obtaining unit includes:

a processing module, configured to amplify each color component, in the color component set obtained by the fourth obtaining unit, respectively by a same ratio; and an obtaining module, configured to obtain the first reflection component set according to the color component set after the processing and the illumination component set obtained by the second filtering unit.

With reference to the second aspect and the possible implementation manners described above, in another possible implementation manner, the apparatus further includes:

a seventh obtaining unit, configured to obtain an enhanced image of the currently processed image according to the first enhanced image obtained by the enhancement processing unit and the second enhanced image obtained by the sixth obtaining unit after the enhancement processing unit obtains the first enhanced image by performing the enhancement processing on the currently processed image according to the luminance gain, and the sixth obtaining unit obtains the second enhanced image according to the second reflection component obtained after the linear stretching.

According to the method and apparatus for enhancing color that are provided by the embodiments of the present invention, Gaussian filtering processing is performed on an obtained luminance component to obtain an illumination component of a currently processed image; a first reflection component of the currently processed image is obtained according to the luminance component and the illumination component; enhancement adjustment is performed on the first reflection component to obtain a second reflection component; then, a luminance gain is obtained according to the luminance component and the second reflection component; and eventually, enhancement processing is performed on the currently processed image according to the luminance gain, to obtain an enhanced image. The solutions provided by the embodiments of the present invention can be used to ensure color fidelity of an image, solve a case of over enhancement on a region having high luminance in an original image which is caused after enhancement processing is performed, and eliminate a large amount of noise that occurs on a region having low luminance in the original image after the enhancement processing is performed.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
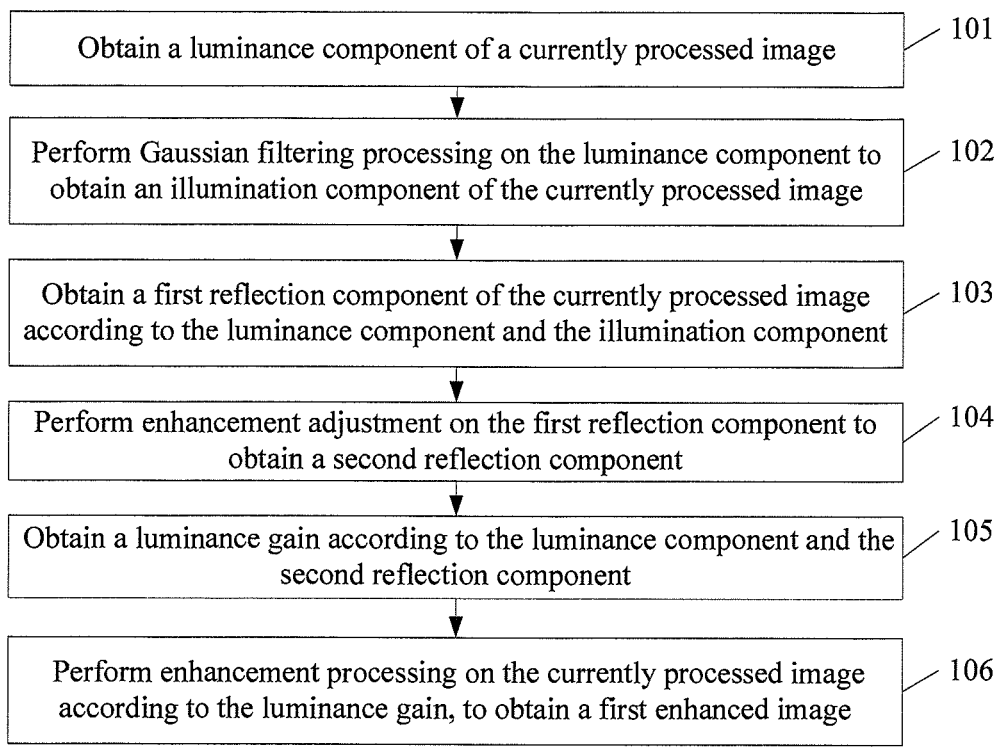
FIG. 1 is a flowchart of a method for enhancing color according to an embodiment of the present invention.

An embodiment of the present invention provides a method for enhancing color. As shown in FIG. 1, the method may include:

101. Obtain a luminance component of a currently processed image.

102. Perform Gaussian filtering processing on the luminance component to obtain an illumination component of the currently processed image.

Gaussian filtering can effectively ensure color fidelity of the currently processed image. Therefore, in the embodiment of the present invention, the luminance component is processed by using the Gaussian filtering, thereby obtaining the illumination component of the currently processed image.

103. Obtain a first reflection component of the currently processed image according to the luminance component and the illumination component.

104. Perform enhancement adjustment on the first reflection component to obtain a second reflection component.

In order to avoid a case of over enhancement that occurs on a region having high luminance in the currently processed image, and avoid a case of a large amount of noise that occurs on a region having low luminance in the currently processed image after enhancement processing is performed, in the embodiment of the present invention, after the first reflection component of the currently processed image is obtained according to the luminance component and the illumination component, the enhancement processing may be performed on the first reflection component to obtain the second reflection component, thereby avoiding cases of over enhancement and noise.

105. Obtain a luminance gain according to the luminance component and the second reflection component.

106. Perform enhancement processing on the currently processed image according to the luminance gain, to obtain a first enhanced image.

According to the method for enhancing color that is provided by the embodiment of the present invention, Gaussian filtering processing is performed on an obtained luminance component to obtain an illumination component of a currently processed image; a first reflection component of the currently processed image is obtained according to the luminance component and the illumination component; enhancement adjustment is performed on the first reflection component to obtain a second reflection component; then, a luminance gain is obtained according to the luminance component and the second reflection component; and eventually, enhancement processing is performed on the currently processed image according to the luminance gain, to obtain an enhanced image. The solutions provided by the embodiment of the present invention can be used to ensure color fidelity of an image, solve a case of over enhancement on a region having high luminance in an original image which is caused after enhancement processing is performed, and eliminate a large amount of noise that occurs on a region having low luminance in the original image after the enhancement processing is performed.

Figure 2:
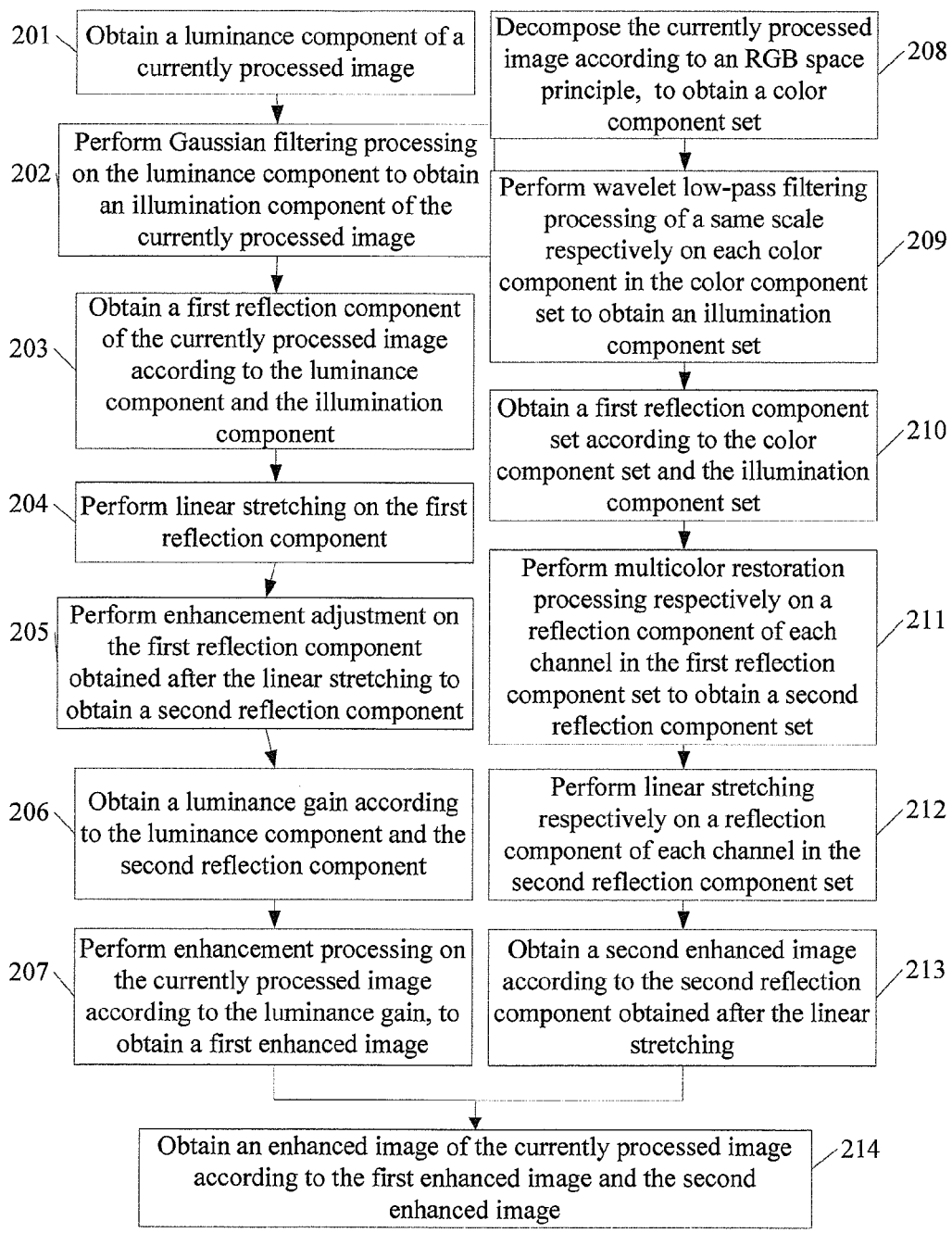
FIG. 2 is a flowchart of a method for enhancing color according to another embodiment of the present invention.

Another embodiment of the present invention provides a method for enhancing color. As shown in FIG. 2, the method may include:

The Retinex theory that is proposed based on the color consistency theory is a method theory based on illumination component estimation. This theory holds that an image is formed by a product of multiplying a reflection component by an illumination component. It is the reflection component therein that can reflect essential information of an original image; the illumination component, in essence, interferes with the image, causing an unsatisfactory visual effect of a collected image. Therefore, the illumination component may be calculated by using an algorithm, and then the illumination component is removed from the original image. That is to say, an interfering part of the image is removed, thereby obtaining the reflection component of the image to implement image enhancement. In the embodiment of the present invention, image enhancement is also implemented based on the Retinex theory. A specific implementation method may include the following steps:

201. Obtain a luminance component of a currently processed image.

The luminance component of the currently processed image is obtained according to an HSV space model. For example, regarding any one pixel among all pixels of the currently processed image, a maximum value of R, G, and B components of the pixel is used as a luminance component of the pixel; then, the same processing is performed on all the pixels in the currently processed image. Eventually, luminance components of all the pixels are obtained. In this way, the luminance components of all the pixels may be combined to obtain the luminance component of the currently processed image.

202. Perform Gaussian filtering processing on the luminance component to obtain an illumination component of the currently processed image.

After the luminance component of the currently processed image is obtained, the Gaussian filtering processing may be performed on the luminance component to obtain the illumination component of the currently processed image. Gaussian filtering can be used to effectively ensure color fidelity of the image.

203. Obtain a first reflection component of the currently processed image according to the luminance component and the illumination component.

After the luminance component and the illumination component of the currently processed image are obtained, the first reflection component of the currently processed image may be obtained according to the obtained luminance component and illumination component. Specifically, a method for obtaining the first reflection component may be obtaining according to the following formula:

$$R_1 = \log(I) - \log(L)$$

where $R_1$ is the first reflection component of the currently processed image, I is the luminance component of the currently processed image, and L is the illumination component of the currently processed image.

204: Perform linear stretching on the first reflection component.

In order to compress a dynamic range of the obtained first reflection component, linear stretching may be performed on the first reflection component. Specifically, an average and a mean squared error of all the pixels of the currently processed image may be calculated first; then, a maximum value and a minimum value for linear stretching are obtained; and linear stretching processing is performed on the first reflection component according to the maximum value and the minimum value for linear stretching. A specific calculation formula may be shown as follows:

$$Max = \mu + \alpha \times \sigma,$$
$$Min = \mu - \alpha \times \sigma$$
$$R = 255 \times \frac{R_1 - Min}{Max - Min}$$

where $\mu$ is an average of the currently processed image; $\sigma$ is a mean squared error of the currently processed image, where according to a "3σ" rule of normal distribution, it may be deemed that pixel values of most pixels of the currently processed image fall within a range [μ−3σ, μ+3σ]; therefore, in order to improve contrast of an enhanced image, α generally may be around 2.0; $R_1$ is the first reflection component of the currently processed image; and R is a first reflection component obtained after the linear stretching.

205. Perform enhancement adjustment on the first reflection component obtained after the linear stretching to obtain a second reflection component.

In order to effectively avoid cases of noise and over enhancement to produce better color and display effect of the image, the enhancement adjustment may be performed on the first reflection component obtained after the linear stretching to obtain the second reflection component. Specifically, the enhancement adjustment may be performed on the first reflection component obtained after the linear stretching according to the following formula:

$$R_2 = R \times \operatorname{Sin} \frac{\pi \times I}{255}$$

where $R_2$ is the second reflection component of the currently processed image, R is the first reflection component obtained after the linear stretching, and I is the luminance component of the currently processed image.

206. Obtain a luminance gain according to the luminance component and the second reflection component.

After the enhancement adjustment is performed on the first reflection component obtained after the linear stretching to obtain the second reflection component, the luminance gain may be obtained according to the second reflection component and the luminance component. Specifically, the luminance gain may be obtained according to the following formula:

$$K = \frac{R_2}{I}$$

where K is the luminance gain, $R_2$ is the second reflection component of the currently processed image, and I is the luminance component of the currently processed image.

207. Perform enhancement processing on the currently processed image according to the luminance gain, to obtain a first enhanced image.

After the luminance gain is obtained, the enhancement processing may be performed according to the luminance gain on the currently processed image. Specifically, three color channels of R, G, and B of the currently processed image may be multiplied respectively by the luminance gain, thereby eventually obtaining the enhanced image, that is, the first enhanced image.

It is commonly known that, using the Gaussian filtering processing to estimate an illumination component of a currently processed image may cause a halo phenomenon to occur on an edge region having sharp image luminance changes after enhancement. Therefore, in order to make the enhanced image to look more naturally, in the embodiment of the present invention, a second enhanced image is obtained by performing the following step 208 to step 213, and then a result of the first enhanced image and the second enhanced image is combined by performing step 214 to obtain a final enhanced image, thereby producing an optimal image enhancement effect.

208. Decompose the currently processed image according to an RGB space principle, to obtain a color component set.

The color component set includes an R component, a G component, and a B component.

209. Perform wavelet low-pass filtering processing of a same scale respectively on each color component in the color component set, thereby obtaining an illumination component set.

In order to make improvement on the halo phenomenon caused by obtaining the illumination component by performing the Gaussian filtering processing, in the embodiment of the present invention, the wavelet low-pass filtering processing of the same scale is performed respectively on each color component in the color component set, thereby obtaining the illumination component set of the currently processed image, where the illumination component set includes an illumination component an R channel of the currently processed image, an illumination component of a G channel of the currently processed image, and an illumination component of a B channel of the currently processed image. This may avoid the halo phenomenon. Moreover, efficiency of performing the wavelet low-pass filtering processing is high. In other words, time for obtaining the illumination component set may be reduced.

210. Obtain a first reflection component set according to the color component set and the illumination component set.

After the color component set and the illumination component set are obtained, the first reflection component set may be obtained according to the color component set and the illumination component set, where the first reflection component set includes a first reflection component of the R channel of the currently processed image, a first reflection component of the G channel of the currently processed image, and a first reflection component of the B channel of the currently processed image.

It is commonly known that when the enhancement processing is performed respectively on the three color channels of the currently processed image to achieve image enhancement, because the three color channels of the image are related to each other, if only simple enhancement processing is performed, color distortion is definitely caused. Therefore, in the embodiment of the present invention, after the reflection component is restored, the color component is adjusted to ensure color fidelity of the image as much as possible. Specifically, the following step 210a and step 210b may be performed.

210a. Amplify each color component in the color component set respectively by a same ratio.

The illumination component set is obtained by performing the wavelet low-pass filtering processing, this may cause serious color distortion of the enhanced image; therefore, in order to ensure that color of the enhanced image is substantially the same as color of the original image, in the embodiment of the present invention, each color component in the color component set may be amplified respectively by the same ratio. For example, each color component in the color component set may be amplified respectively by 1+β, where β is an amplification ratio.

210b. Obtain the first reflection component set according to the color component set after the processing and the illumination component set.

After each color component in the color component set is amplified respectively by the same ratio, the first reflection component set may be obtained according to the color component set after the processing and the illumination component set. In an example where a multicolor component is an R component, the first reflection component of the R channel may be specifically obtained according to the following calculation formula:

$$R_{r1}=(1+\beta)\log(I_r)-\log(L_r)$$

where $R_{r1}$ is the first reflection component of the R channel; $I_r$ is the R component; $L_r$ is the illumination component of the R channel; and β is a ratio for amplifying each color component in the color component set, and a value range of β may be 0<β<1

211. Perform multicolor restoration processing respectively on the reflection component of each channel in the first reflection component set to obtain a second reflection component set.

After the first reflection component set is obtained, the multicolor restoration processing may be performed respectively on the reflection component of each channel in the first reflection component set to obtain the second reflection component set. Specific color restoration processing may be performed according to the following formula in an example where a multicolor component is the R component:

$$R_{r2}=C_r \times R_{r1}$$

where $R_{r2}$ is the second reflection component of the R channel; $C_r$ is a color restoration factor of the R channel, and $$C_r = \log\frac{I_r}{I_r+I_g+I_b};$$

$I_r$ is the R component; $I_g$ is the G component; $I_b$ is the B component; and $R_{r1}$ is the first reflection component of the R channel.

212. Perform linear stretching respectively on a reflection component of each channel in the second reflection component set.

After the second reflection component set is obtained, the linear stretching may be performed respectively on the reflection component of each channel in the second reflection component.

It should be noted that, reference may be made to the description of corresponding parameters in step 204 of the embodiment of the present invention for a description of specific parameters for linear stretching, which is not described repeatedly in the embodiment of the present invention.

213. Obtain a second enhanced image according to the second reflection component obtained after the linear stretching.

After the second reflection component obtained after the linear stretching is obtained, the second enhanced image may be obtained according to the second reflection component obtained after the linear stretching.

It should be noted that in the embodiment of the present invention, no execution sequence is specified for step 201 to step 207 and step 208 to step 213. The embodiment of the present invention sets no limit to the execution sequence of step 201 to step 207 and step 208 to step 213.

214. Obtain an enhanced image of the currently processed image according to the first enhanced image and the second enhanced image.

After the first enhanced image and the second enhanced image are obtained, the images obtained by performing the enhancement processing twice may be combined. In other words, the enhanced image of the currently processed image may be obtained by combining the first enhanced image and the second enhanced image. Specifically, the final enhanced image may be obtained according to the following formula:

$$I_{out}=w \times I_{out1}+(1-w) \times I_{out2}$$

where $I_{out}$ is the finally obtained enhanced image; $I_{out1}$ is the first enhanced image; $I_{out2}$ is the second enhanced image; and w is a weight for performing weighting calculation on the first enhanced image and the second enhanced image, which generally may be 0.5.

According to the method for enhancing color that is provided by the embodiment of the present invention, Gaussian filtering processing is performed on an obtained luminance component to obtain an illumination component of a currently processed image; a first reflection component of the currently processed image is obtained according to the luminance component and the illumination component; enhancement adjustment is performed on the first reflection component to obtain a second reflection component; then, a luminance gain is obtained according to the luminance component and the second reflection component; and eventually, enhancement processing is performed on the currently processed image according to the luminance gain, to obtain an enhanced image. The solutions provided by the embodiment of the present invention can be used to ensure color fidelity of an image, solve a case of over enhancement on a region having high luminance in an original image which is caused after enhancement processing is performed, and eliminate a large amount of noise that occurs on a region having low luminance in the original image after the enhancement processing is performed.

Moreover, a single-scale filtering method is used to reduce the calculation amount, and wavelet low-pass filtering is used to obtain the illumination component, which can effectively avoid the halo phenomenon and reduce processing duration for obtaining the illumination component. After the reflection component is restored, the color component is adjusted to further ensure color fidelity of the image. Eventually, results obtained by using the two processing methods are combined to obtain the final enhanced image, where the final enhanced image is better than the two methods.

Figure 3:
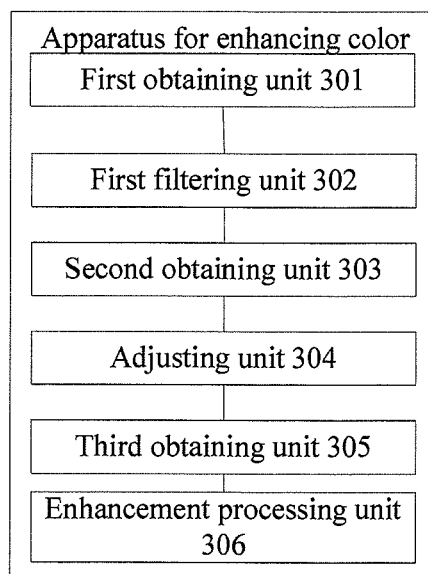
FIG. 3 is a schematic structural diagram of an apparatus for enhancing color according to another embodiment of the present invention.

Another embodiment of the present invention provides an apparatus for enhancing color, which, as shown in FIG. 3, includes a first obtaining unit 301, a first filtering unit 302, a second obtaining unit 303, an adjusting unit 304, a third obtaining unit 305, and an enhancement processing unit 306.

The first obtaining unit 301 is configured to obtain a luminance component of a currently processed image.

The first filtering unit 302 is configured to perform Gaussian filtering processing on the luminance component obtained by the first obtaining unit 301 to obtain an illumination component of the currently processed image.

The second obtaining unit 303 is configured to obtain a first reflection component of the currently processed image according to the luminance component obtained by the first obtaining unit 301 and the illumination component obtained by the first filtering unit 302.

The adjusting unit 304 is configured to perform enhancement adjustment on the first reflection component obtained by the second obtaining unit 303 to obtain a second reflection component.

The third obtaining unit 305 is configured to obtain a luminance gain according to the luminance component obtained by the first obtaining unit 301 and the second reflection component obtained by the adjusting unit 304.

The enhancement processing unit 306 is configured to perform enhancement processing on the currently processed image according to the luminance gain obtained by the third obtaining unit 305, to obtain a first enhanced image.

Figure 4:
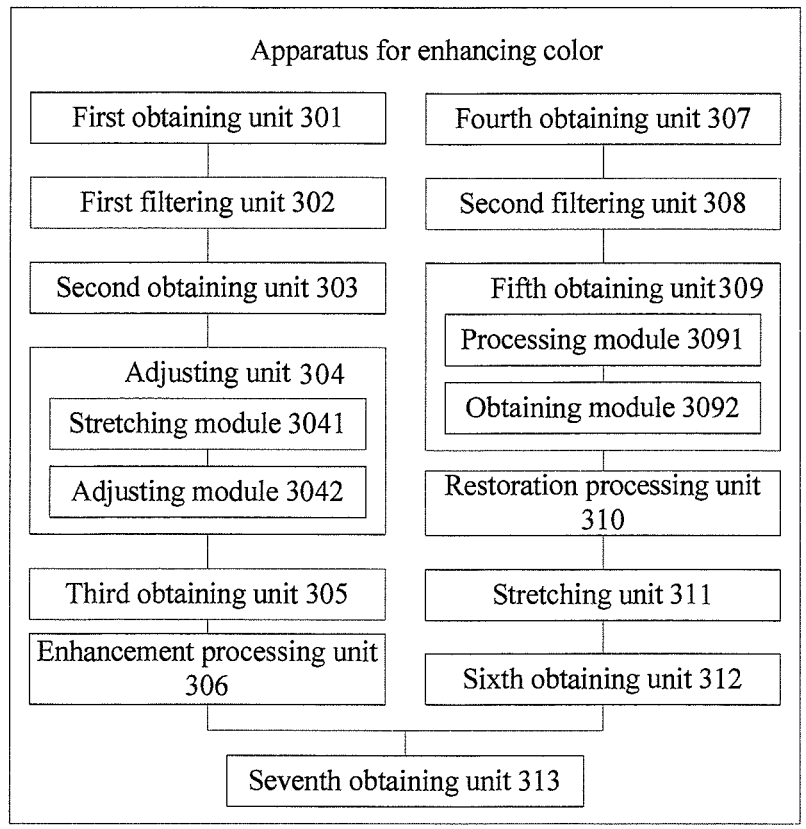
FIG. 4 is a schematic structural diagram of another apparatus for enhancing color according to another embodiment of the present invention.

Further, as shown in FIG. 4, the adjusting unit 304 may include a stretching module 3041 and an adjusting module 3042.

The stretching module 3041 is configured to perform linear stretching on the first reflection component.

The adjusting module 3042 is configured to perform the enhancement adjustment on the first reflection component obtained after the linear stretching to obtain the second reflection component.

Further, the apparatus may further include a fourth obtaining unit 307, a second filtering unit 308, a fifth obtaining unit 309, a restoration processing unit 310, a stretching unit 311, and a sixth obtaining unit 312.

The fourth obtaining unit 307 is configured to decompose the currently processed image according to an RGB space principle, to obtain a color component set, where the color component set includes an R component, a G component, and a B component.

The second filtering unit 308 is configured to perform wavelet low-pass filtering processing of a same scale respectively on each color component in the color component set obtained by the fourth obtaining unit 307, thereby obtaining an illumination component set, where the illumination component set includes an illumination component of an R channel of the currently processed image, an illumination component of a G channel of the currently processed image, and an illumination component of a B channel of the currently processed image.

The fifth obtaining unit 309 is configured to obtain a first reflection component set according to the color component set obtained by the fourth obtaining unit 307 and the illumination component set obtained by the second filtering unit 308, where the first reflection component set includes a first reflection component of the R channel of the currently processed image, a first reflection component of the G channel of the currently processed image, and a first reflection component of the B channel of the currently processed image.

The restoration processing unit 310 is configured to perform multicolor restoration processing respectively on the reflection component of each channel in the first reflection component set obtained by the fifth obtaining unit 309, thereby obtaining a second reflection component set.

The stretching unit 311 is configured to perform linear stretching respectively on a reflection component of each channel in the second reflection component set obtained by the restoration processing unit 310.

The sixth obtaining unit 312 is configured to obtain a second enhanced image according to the second reflection component obtained after the linear stretching.

Further, the fifth obtaining unit 309 may include a processing module 3091 and an obtaining module 3092.

The processing module 3091 is configured to amplify each color component, in the color component set obtained by the fourth obtaining unit 307, respectively by a same ratio.

The obtaining module 3092 is configured to obtain the first reflection component set according to the color component set after the processing and the illumination component set obtained by the second filtering unit 308.

Further, the apparatus may further include a seventh obtaining unit 313.

The seventh obtaining unit 313 is configured to obtain an enhanced image of the currently processed image according to the first enhanced image obtained by the enhancement processing unit 306 and the second enhanced image obtained by the sixth obtaining unit 312 after the enhancement processing unit 306 obtains the first enhanced image by performing the enhancement processing on the currently processed image according to the luminance gain, and the sixth obtaining unit 312 obtains the second enhanced image according to the second reflection component obtained after the linear stretching.

According to the apparatus for enhancing color that is provided by the embodiment of the present invention, Gaussian filtering processing is performed on an obtained luminance component to obtain an illumination component of a currently processed image; a first reflection component of the currently processed image is obtained according to the luminance component and the illumination component; enhancement adjustment is performed on the first reflection component to obtain a second reflection component; then, a luminance gain is obtained according to the luminance component and the second reflection component; and eventually, enhancement processing is performed on the currently processed image according to the luminance gain, to obtain an enhanced image. The solutions provided by the embodiment of the present invention can be used to ensure color fidelity of an image, solve a case of over enhancement on a region having high luminance in an original image which is caused after enhancement processing is performed, and eliminate a large amount of noise that occurs on a region having low luminance in the original image after the enhancement processing is performed.

Moreover, a single-scale filtering method is used to reduce the calculation amount, and wavelet low-pass filtering is used to obtain the illumination component, which can effectively avoid the halo phenomenon and reduce processing duration for obtaining the illumination component. After the reflection component is restored, the color component is adjusted to further ensure color fidelity of the image. Eventually, results obtained by using the two processing methods are combined to obtain the final enhanced image, where the final enhanced image is better than the two methods.

Figure 5:
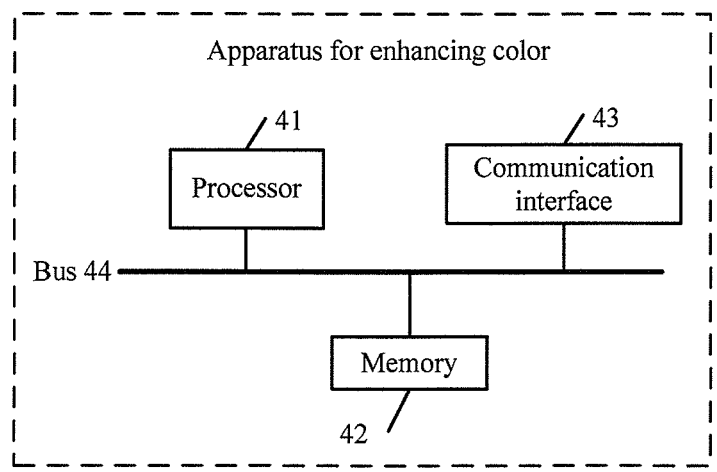
FIG. 5 is a schematic structural diagram of still another apparatus for enhancing color according to another embodiment of the present invention.

Another embodiment of the present invention provides an apparatus for enhancing color, which, as shown in FIG. 5, includes at least one processor 41, a memory 42, a communication interface 43, and a bus 44, where the at least one processor 41, the memory 42, and the communication interface 43 are connected and communicate with each other by using the bus 44.

The bus 44 may be an Industry Standard Architecture (Industry Standard Architecture, ISA) bus, a Peripheral Component Interconnect (Peripheral Component Interconnect, PCI) bus, an Extended Industry Standard Architecture (Extended Industry Standard Architecture, EISA) bus, or the like. The bus 44 may be classified into an address bus, a data bus, a control bus, and the like. For the convenience of denotation, the bus is represented by using one thick line in FIG. 5; however, it does not indicate that there is only one bus or only one type of buses.

The memory 42 is configured to store executable program code, where the program code includes computer operation instructions. The memory 42 may include a high-speed RAM memory, and may also include a non-volatile memory (non-volatile memory), such as at least one disk memory.

The processor 41 may be a central processing unit (Central Processing Unit, CPU), or an application-specific integrated circuit (Application Specific Integrated Circuit, ASIC), or be configured to be one or more integrated circuits implementing the embodiments the present invention.

The communication interface 43 is mainly configured to implement communication between devices according to this embodiment.

The processor 41 is further configured to obtain a luminance component of a currently processed image; perform Gaussian filtering processing on the luminance component to obtain an illumination component of the currently processed image; obtain a first reflection component of the currently processed image according to the luminance component and the illumination component; perform enhancement adjustment on the first reflection component to obtain a second reflection component; obtain a luminance gain according to the luminance component and the second reflection component; and perform enhancement processing on the currently processed image according to the luminance gain, to obtain a first enhanced image.

Further, the processor 41 is further configured to perform linear stretching on the first reflection component, and perform enhancement adjustment on the first reflection component obtained after the linear stretching to obtain the second reflection component.

Further, the processor 41 is further configured to decompose the currently processed image according to an RGB space principle, to obtain a color component set, where the color component set includes an R component, a G component, and a B component; perform wavelet low-pass filtering processing of the same scale respectively on each color component in the color component set, thereby obtaining an illumination component set, where the illumination component set includes an illumination component of an R channel of the currently processed image, an illumination component of a G channel of the currently processed image, and an illumination component of a B channel of the currently processed image; obtain a first reflection component set according to the color component set and the illumination component set, where the first reflection component set includes a first reflection component of the R channel of the currently processed image, a first reflection component of the G channel of the currently processed image, and a first reflection component of the B channel of the currently processed image; perform multicolor restoration processing respectively on the reflection component of each channel in the first reflection component set to obtain a second reflection component set; perform linear stretching respectively on a reflection component of each channel in the second reflection component set; and obtain a second enhanced image according to the second reflection component obtained after the linear stretching.

Further, the processor 41 is further configured to amplify each color component in the color component set respectively by a same ratio, and obtain the first reflection component set according to the color component set after the processing and the illumination component set.

Further, the processor 41 is further configured to obtain an enhanced image of the currently processed image according to the first enhanced image and the second enhanced image after performing the enhancement processing on the currently processed image according to the luminance gain, to obtain the first enhanced image, and obtaining the second enhanced image according to the second reflection component obtained after the linear stretching.

According to the apparatus for enhancing color that is provided by the embodiment of the present invention, Gaussian filtering processing is performed on an obtained luminance component to obtain an illumination component of a currently processed image; a first reflection component of the currently processed image is obtained according to the luminance component and the illumination component; enhancement adjustment is performed on the first reflection component to obtain a second reflection component; then, a luminance gain is obtained according to the luminance component and the second reflection component; and eventually, enhancement processing is performed on the currently processed image according to the luminance gain, to obtain an enhanced image. The solutions provided by the embodiment of the present invention can be used to ensure color fidelity of an image, solve a case of over enhancement on a region having high luminance in an original image which is caused after enhancement processing is performed, and eliminate a large amount of noise that occurs on a region having low luminance in the original image after the enhancement processing is performed.

Moreover, a single-scale filtering method is used to reduce the calculation amount, and wavelet low-pass filtering is used to obtain the illumination component, which can effectively avoid the halo phenomenon and reduce processing duration for obtaining the illumination component. After the reflection component is restored, the color component is adjusted to further ensure color fidelity of the image. Eventually, results obtained by using the two processing methods are combined to obtain the final enhanced image, where the final enhanced image is better than the two methods.

According to the description of the embodiments above, a person skilled in the art may clearly understand that the present invention may be implemented by software with necessary common hardware. Certainly, the present invention may also be implemented by only hardware. However, the former is the preferred implementation manner. Based on such an understanding, the technical solutions of the present invention essentially, or the part contributing to the prior art may be implemented in a form of a software product. The computer software product is stored in a readable storage medium, for example, a floppy disk, hard disk, or optical disc of the computer, and includes several instructions for instructing a computer device (which may be a personal computer, a server, a network device, or the like) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for enhancing color, the method comprising:
    obtaining a luminance component of a currently processed image, wherein the luminance component is obtained by combining luminance components of all pixels in the currently processed image;
    performing Gaussian filtering processing on the luminance component to obtain an illumination component of the currently processed image;
    obtaining a first reflection component of the currently processed image according to the luminance component and the illumination component;
    performing enhancement adjustment on the first reflection component to obtain a second reflection component;
    obtaining a luminance gain according to the luminance component and the second reflection component; and
    performing enhancement processing on the currently processed image according to the luminance gain, to obtain a first enhanced image.

2. The method for enhancing color according to claim 1, wherein performing enhancement adjustment on the first reflection component to obtain a second reflection component comprises:
    performing linear stretching on the first reflection component; and
    performing the enhancement adjustment on the first reflection component obtained after the linear stretching to obtain the second reflection component.

3. A method for enhancing color, the method comprising:
    obtaining a luminance component of a currently processed image;
    performing Gaussian filtering processing on the luminance component to obtain an illumination component of the currently processed image;
    obtaining a first reflection component of the currently processed image according to the luminance component and the illumination component;
    performing enhancement adjustment on the first reflection component to obtain a second reflection component;
    obtaining a luminance gain according to the luminance component and the second reflection component; and
    performing enhancement processing on the currently processed image according to the luminance gain, to obtain a first enhanced image;
    decomposing the currently processed image according to an RGB space principle, to obtain a color component set, wherein the color component set comprises an R component, a G component, and a B component;
    performing wavelet low-pass filtering processing of a same scale respectively on each color component in the color component set, thereby obtaining an illumination component set, wherein the illumination component set comprises an illumination component of an R channel of the currently processed image, an illumination component of a G channel of the currently processed image, and an illumination component of a B channel of the currently processed image;
    obtaining a first reflection component set according to the color component set and the illumination component set, wherein the first reflection component set comprises a first reflection component of the R channel of the currently processed image, a first reflection component of the G channel of the currently processed image, and a first reflection component of the B channel of the currently processed image;
    performing multicolor restoration processing respectively on the reflection component of each channel in the first reflection component set to obtain a second reflection component set;
    performing linear stretching respectively on a reflection component of each channel in the second reflection component set; and
    obtaining a second enhanced image according to the second reflection component obtained after the linear stretching.

4. The method for enhancing color according to claim 3, wherein obtaining a first reflection component set according to the color component set and the illumination component set comprises:
    amplifying each color component in the color component set respectively by a same ratio; and
    obtaining the first reflection component set according to the color component set after the processing and the illumination component set.

5. The method for enhancing color according to claim 1, wherein after performing enhancement processing on the currently processed image according to the luminance gain, to obtain a first enhanced image, the method further comprises:
    obtaining a second enhanced image by removing a halo phenomenon in the first enhanced image;
    obtaining an enhanced image of the currently processed image according to the first enhanced image and the second enhanced image.

6. The method for enhancing color according to claim 2, wherein after performing enhancement processing on the currently processed image according to the luminance gain, to obtain a first enhanced image, the method further comprises:
    obtaining a second enhanced image by removing a halo phenomenon in the first enhanced image;
    obtaining an enhanced image of the currently processed image according to the first enhanced image and the second enhanced image.

7. The method for enhancing color according to claim 3, wherein after performing enhancement processing on the currently processed image according to the luminance gain, to obtain a first enhanced image, and obtaining a second enhanced image according to the second reflection component obtained after the linear stretching, the method further comprises:
    obtaining an enhanced image of the currently processed image according to the first enhanced image and the second enhanced image.

8. The method for enhancing color according to claim 4, wherein after performing enhancement processing on the currently processed image according to the luminance gain, to obtain a first enhanced image, and obtaining a second enhanced image according to the second reflection component obtained after the linear stretching, the method further comprises:

obtaining an enhanced image of the currently processed image according to the first enhanced image and the second enhanced image.

9. An apparatus for enhancing color, the apparatus comprising:

a first obtaining unit, configured to obtain a luminance component of a currently processed image, wherein the luminance component is obtained by combining luminance components of all pixels in the currently processed image;

a first filtering unit, configured to perform Gaussian filtering processing on the luminance component obtained by the first obtaining unit to obtain an illumination component of the currently processed image;

a second obtaining unit, configured to obtain a first reflection component of the currently processed image according to the luminance component obtained by the first obtaining unit and the illumination component obtained by the first filtering unit;

an adjusting unit, configured to perform enhancement adjustment on the first reflection component obtained by the second obtaining unit to obtain a second reflection component;

a third obtaining unit, configured to obtain a luminance gain according to the luminance component obtained by the first obtaining unit and the second reflection component obtained by the adjusting unit; and an enhancement processing unit, configured to perform enhancement processing on the currently processed image according to the luminance gain obtained by the third obtaining unit, to obtain a first enhanced image.

10. The apparatus for enhancing color according to claim 9, wherein the adjusting unit comprises:

a stretching module, configured to perform linear stretching on the first reflection component; and an adjusting module, configured to perform the enhancement adjustment on the first reflection component obtained after the linear stretching to obtain the second reflection component.

11. An apparatus for enhancing color, the apparatus comprising:

a first obtaining unit, configured to obtain a luminance component of a currently processed image;

a first filtering unit, configured to perform Gaussian filtering processing on the luminance component obtained by the first obtaining unit to obtain an illumination component of the currently processed image;

a second obtaining unit, configured to obtain a first reflection component of the currently processed image according to the luminance component obtained by the first obtaining unit and the illumination component obtained by the first filtering unit;

an adjusting unit, configured to perform enhancement adjustment on the first reflection component obtained by the second obtaining unit to obtain a second reflection component;

a third obtaining unit, configured to obtain a luminance gain according to the luminance component obtained by the first obtaining unit and the second reflection component obtained by the adjusting unit; and an enhancement processing unit, configured to perform enhancement processing on the currently processed image according to the luminance gain obtained by the third obtaining unit, to obtain a first enhanced image;

a fourth obtaining unit, configured to decompose the currently processed image according to an RGB space principle, to obtain a color component set, wherein the color component set comprises an R component, a G component, and a B component;

a second filtering unit, configured to perform wavelet low-pass filtering processing of a same scale respectively on each color component in the color component set obtained by the fourth obtaining unit, thereby obtaining an illumination component set, wherein the illumination component set comprises an illumination component of an R channel of the currently processed image, an illumination component of a G channel of the currently processed image, and an illumination component of a B channel of the currently processed image;

a fifth obtaining unit, configured to obtain a first reflection component set according to the color component set obtained by the fourth obtaining unit and the illumination component set obtained by the second filtering unit, wherein the first reflection component set comprises a first reflection component of the R channel of the currently processed image, a first reflection component of the G channel of the currently processed image, and a first reflection component of the B channel of the currently processed image;

a restoration processing unit, configured to perform multi-color restoration processing respectively on the reflection component of each channel in the first reflection component set obtained by the fifth obtaining unit, thereby obtaining a second reflection component set;

a stretching unit, configured to perform linear stretching respectively on a reflection component of each channel in the second reflection component set obtained by the restoration processing unit; and a sixth obtaining unit, configured to obtain a second enhanced image according to the second reflection component obtained after the linear stretching.

12. The apparatus for enhancing color according to claim 11, wherein the fifth obtaining unit comprises:

a processing module, configured to amplify each color component, in the color component set obtained by the fourth obtaining unit, respectively by a same ratio; and an obtaining module, configured to obtain the first reflection component set according to the color component set after the processing and the illumination component set obtained by the second filtering unit.

13. The apparatus for enhancing color according to claim 9, further comprising:

a fourth obtaining unit configured to obtain a second enhanced image by removing a halo phenomenon in the first enhanced image;

a fifth obtaining unit, configured to obtain an enhanced image of the currently processed image according to the first enhanced image obtained by the enhancement processing unit and the second enhanced image obtained by the fourth obtaining unit after the enhancement processing unit obtains the first enhanced image by performing the enhancement processing on the currently processed image according to the luminance gain, and the fourth obtaining unit obtains the second enhanced image.

14. The apparatus for enhancing color according to claim 10, further comprising:

a fourth obtaining unit configured to obtain a second enhanced image by removing a halo phenomenon in the first enhanced image;

a fifth obtaining unit, configured to obtain an enhanced image of the currently processed image according to the first enhanced image obtained by the enhancement processing unit and the second enhanced image obtained by the fourth obtaining unit after the enhancement processing unit obtains the first enhanced image by performing the enhancement processing on the currently processed image according to the luminance gain, and the fourth obtaining unit obtains the second enhanced image.

15. The apparatus for enhancing color according to claim 11, further comprising:
a seventh obtaining unit, configured to obtain an enhanced image of the currently processed image according to the first enhanced image obtained by the enhancement processing unit and the second enhanced image obtained by the sixth obtaining unit after the enhancement processing unit obtains the first enhanced image by performing the enhancement processing on the currently processed image according to the luminance gain, and the sixth obtaining unit obtains the second enhanced image according to the second reflection component obtained after the linear stretching.

16. The apparatus for enhancing color according to claim 12, further comprising:
a seventh obtaining unit, configured to obtain an enhanced image of the currently processed image according to the first enhanced image obtained by the enhancement processing unit and the second enhanced image obtained by the sixth obtaining unit after the enhancement processing unit obtains the first enhanced image by performing the enhancement processing on the currently processed image according to the luminance gain, and the sixth obtaining unit obtains the second enhanced image according to the second reflection component obtained after the linear stretching.

* * * * *